(12) United States Patent
Holur et al.

(10) Patent No.: US 7,107,342 B1
(45) Date of Patent: Sep. 12, 2006

(54) METHOD AND SYSTEM FOR PROVIDING SERVICE TRIGGER MANAGEMENT IN A WIRELESS NETWORK

(75) Inventors: Balaji S. Holur, Plano, TX (US); Charles J. Derrick, Plano, TX (US); Kenneth W. Davidson, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 814 days.

(21) Appl. No.: 09/771,257

(22) Filed: Jan. 26, 2001

(51) Int. Cl.
*G06F 13/00* (2006.01)

(52) U.S. Cl. ............... 709/225; 709/219; 709/227; 709/237

(58) Field of Classification Search ........... 709/217, 709/219, 223, 224, 225, 226, 227, 228, 229, 709/237, 238, 250; 370/230, 231
See application file for complete search history.

(56) References Cited

U.S. PATENT DOCUMENTS

| | | | |
|---|---|---|---|
| 5,586,121 A | 12/1996 | Moura et al. | 370/404 |
| 5,610,910 A | 3/1997 | Focsaneanu et al. | 370/351 |
| 5,818,845 A | 10/1998 | Moura et al. | 370/449 |
| 5,828,666 A | 10/1998 | Focsaneanu et al. | 370/389 |
| 5,991,292 A | 11/1999 | Focsaneanu et al. | 370/352 |
| 6,005,580 A | 12/1999 | Donovan | 345/428 |
| 6,075,792 A | 6/2000 | Ozluturk | 370/441 |
| 6,115,370 A | 9/2000 | Struhsaker et al. | 370/342 |
| 6,119,001 A * | 9/2000 | Delis et al. | 455/433 |
| 6,201,962 B1 | 3/2001 | Sturniolo et al. | 455/432.2 |
| 6,272,315 B1 * | 8/2001 | Chang et al. | 455/13.1 |
| 6,327,254 B1 | 12/2001 | Chuah | 370/328 |
| 6,393,468 B1 * | 5/2002 | McGee | 709/218 |
| 6,452,942 B1 | 9/2002 | Lemieux | 370/468 |
| 6,539,219 B1 * | 3/2003 | Gallant et al. | 455/416 |
| 6,584,190 B1 * | 6/2003 | Bressler | 379/230 |
| 6,606,663 B1 * | 8/2003 | Liao et al. | 709/229 |
| 6,614,774 B1 * | 9/2003 | Wang | 370/338 |
| 6,665,537 B1 | 12/2003 | Lioy | 455/435 |
| 6,675,208 B1 * | 1/2004 | Rai et al. | 709/224 |
| 6,732,150 B1 * | 5/2004 | Thrane | 709/206 |
| 6,735,215 B1 * | 5/2004 | Cao | 370/437 |
| 6,741,848 B1 * | 5/2004 | Timonen et al. | 455/405 |
| 6,748,433 B1 * | 6/2004 | Yaakov | 709/224 |
| 6,765,925 B1 * | 7/2004 | Sawyer et al. | 370/465 |
| 6,766,373 B1 * | 7/2004 | Beadle et al. | 709/227 |
| 6,785,228 B1 * | 8/2004 | Vandette et al. | 370/230 |
| 6,856,612 B1 * | 2/2005 | Bjelland et al. | 370/338 |
| 6,862,594 B1 * | 3/2005 | Saulpaugh et al. | 707/10 |
| 2002/0037744 A1 * | 3/2002 | Bhatia et al. | 455/557 |
| 2002/0065064 A1 * | 5/2002 | Griffith et al. | 455/405 |
| 2002/0075844 A1 * | 6/2002 | Hagen | 370/351 |
| 2003/0039237 A1 * | 2/2003 | Forslow | 370/352 |

OTHER PUBLICATIONS

Holur, et al., U.S. Appl. No. 10/004,320, filed Oct. 30, 2001, *Method and System for Managing Pushed Data at a Mobile Unit*, 50 pages of Specification, Claims and Abstract and 6 pages of drawings.

(Continued)

*Primary Examiner*—Viet D. Vu
(74) *Attorney, Agent, or Firm*—Baker Botts L.L.P.

(57) ABSTRACT

A method for providing service trigger management in a wireless network is provided. The method includes generating at an application of a mobile unit a current request for a network session. Allowability of the session is determined based on a service agreement without accessing external resources.

47 Claims, 5 Drawing Sheets

OTHER PUBLICATIONS

Holur, et al., U.S. Appl. No. 09/908,348, filed Jul. 18, 2001, *Method and System for Managing Wireless Bandwidth Resource*, 59 pages of Specification, Claims and Abstract and 7 pages of drawings.

Holur, et al., U.S. Appl. No. 09/771,205, filed Jan. 26, 2001, *Method and System for Label Edge Routing in a Wireless Network*, 48 pages of Specification, Claims and Abstract and 9 pages of drawings.

TR45, cdma2000 Wireless IP Network Standard, TIA/EIA/IS-835-B, 1-page cover, 8 pages Table of Contents, Figures, Tables and Revision History, and 98 pages of text, Sep. 2002.

Mobile Wireless Internet Forum (mwif), "*Network Reference Architecture Technical Report MTR-004*", Release 2.0, Contribution Reference No. MWIF 2001.053.3, 95 pages, Jun. 13, 2003.

Mobile Wireless Internet Forum (mwif), *OpenRAN Architecture in 3rd Generation Mobile Systems*, Technical Report MTR-007, Release v1.0.0, 64 pages, Sep. 4, 2001.

3GPP TS 22.101 6.4.0, *3rd Generation Partnership Project; Technical Specification Group Services and System Aspects Service aspects; Service principles*, Release 6, 45 pages, Jun. 2003.

Xerox PARC, RFC 1256, "*ICMP Router Discovery Messages*", 18 pages.

Wu, et al, RFC 3270, "*Multi-Protocol Label Switching (MPLS) Support of Differentiated Services*", 57 pages, May 2002.

IBM, RFC 2002, "*IP Mobility Support*", 71 pages, Oct. 1996.

std005, RFC 791, "*Internet Protocol*", DARPA Internet Program Protocol Specification, 115 pages, Sep. 1981.

J. Boyle, et al, IPHighway, RFC 2749, "*COPS Usage for RSVP*", 16 pages, Jan. 2000.

S. Herzog, IPHighway, RFC 2750, "*RSVP Extensions for Policy Control*", 13 pages, Jan. 2000.

Xerox PARC, RFC 2236, "*Internet Group Management Protocol, Version 2*", 23 pages, Nov. 1997.

J. Boyle, et al, "*The COPS (Common Open Policy Service) Protocol*", RFC 2748, 36 pages, Jan. 2000.

3GPP Specifications—Numbering Scheme, http://www.3gpp.org/specs/numbering.htm, 2 pages, May 7, 2003.

\* cited by examiner

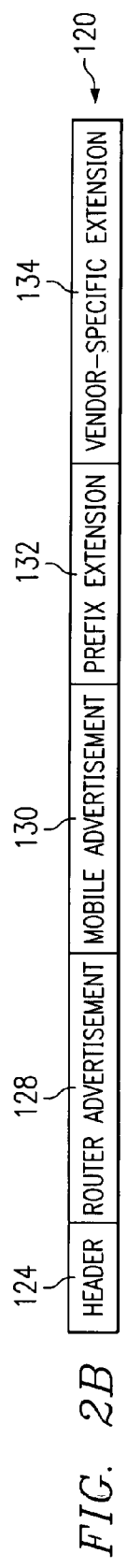

METHOD AND SYSTEM FOR PROVIDING SERVICE TRIGGER MANAGEMENT IN A WIRELESS NETWORK

TECHNICAL FIELD OF THE INVENTION

This invention relates generally to the field of wireless communications and more particularly to a method and system for providing service trigger management in a wireless network.

BACKGROUND OF THE INVENTION

The communications industry is a rapidly growing industry that affects almost every other major industry. Because of the field's rapid growth, the management of communication systems has become more difficult as the systems have become increasingly larger and more complex. Modern communication systems include wireless devices that are capable of attempting to initiate network sessions through serving nodes that couple the wireless devices to a network. Because of this, the serving nodes must be capable of monitoring the wireless device's communication in order to provide the appropriate network sessions in accordance with the user's service level agreement with the network service provider.

Traditional methods for providing the appropriate network sessions require the serving node to process payload data in every packet from a wireless device that is destined for the network in order to verify proper session activity for the user. For example, if a user attempts to access a particular web-site, the serving node retrieves this information from the packet sent by the wireless device. The serving node then checks the user's agreement with the network service provider to determine whether the user is allowed access to the requested web-site. If the user is allowed access, the serving node transmits the packet to the network for further processing. If the user is not allowed access, the serving node may inform the user that access is denied or may request additional information from the user which may allow access.

Therefore, in order to accurately provide service to each user in this way, the serving node has to hold and inspect every packet from the wireless device, check the contents of the payload data against conditions for the user, and take appropriate action in response to the results. Providing service in this manner places a large burden on the resources of the serving node.

SUMMARY OF THE INVENTION

In accordance with the present invention, a method and system for providing service trigger management in a wireless network are provided that substantially eliminate or reduce disadvantages and problems associated with previously developed systems and methods. In particular, the present invention provides mobile-assisted service trigger management to assist the serving node in providing service triggers.

In one embodiment of the present invention, a method for providing service trigger management in a wireless network is provided. The method includes generating at an application of a mobile unit a current request for a network session. Allowability of the session is determined based on a service agreement without accessing external resources.

In another embodiment of the present invention, a method for providing service trigger management in a wireless network is provided that includes receiving out-of-band communication from a mobile unit at a foreign agent of a serving node. The out-of-band communication includes a request for a network session. A determination is made regarding whether the request is allowable. Out-of-band communication is sent from the foreign agent to the mobile unit. The out-of-band communication includes an acceptance or a rejection of the request based on the determination of whether the request is allowable.

Technical advantages of the present invention include providing an improved method for providing service trigger management in a wireless network. In a particular embodiment, out-of-band messages are communicated between a wireless device and an agent in the serving node when the wireless device is attempting to initiate a network session. As a result, the agent may verify session activity and inform the wireless device, which may then connect to the network as requested, without the payload data being inspected and the contents of the payload data being checked against user conditions for each packet message from a wireless device. Accordingly, the burden on the resources of the serving node with regard to verifying session activity is greatly reduced, freeing those resources to accomplish other tasks.

In addition, the wireless device assists in service trigger management by tracking previously accepted or rejected sessions in the wireless device. As a result, the serving node is not required to re-verify a session that has been processed previously. In addition, the amount of signaling sent over the air from the wireless device to the serving node with regard to service trigger management is reduced.

Another technical advantage includes providing an out-of-band signaling mechanism through the use of agent discovery messages. This allows the wireless device and the serving node to communicate with out-of-band messages. Accordingly, the traffic and the signaling messages do not need to be mixed. As a result, the serving node does not need to inspect every packet for service trigger management.

Other technical advantages of the present invention include distributing intelligence about network sessions across the wireless infrastructure and the wireless devices. This reduces processing power required by the wireless infrastructure, which reduces costs for the operator. The intelligence distribution also provides increased flexibility in terms of service management, and allows a user more flexibility in selecting services. As a result, the service provider may obtain increased revenues, while the user may select services in real-time and inform the wireless infrastructure of actions and conditions for the newly selected services.

Other technical advantages will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like numerals represent like parts, in which:

FIG. 2A is a block diagram illustrating a message structure for an Agent Solicitation Message (ASM) for providing out-of-band communication within the system of FIG. 1 in accordance with one embodiment of the present invention;

FIG. 2B is a block diagram illustrating a message structure for an Agent Advertisement Message (AAM) for providing out-of-band communication within the system of FIG. 1 in accordance with one embodiment of the present invention;

FIG. 2C is a block diagram illustrating a message structure for the Vendor-Specific Extensions of the ASM and the AAM of FIGS. 2A–B in accordance with one embodiment of the present invention;

FIG. 3 is a block diagram illustrating a protocol stack for communication over the wireless link of the system of FIG. 1 in accordance with one embodiment of the present invention.

DETAILED DESCRIPTION OF THE INVENTION

Figure 1:
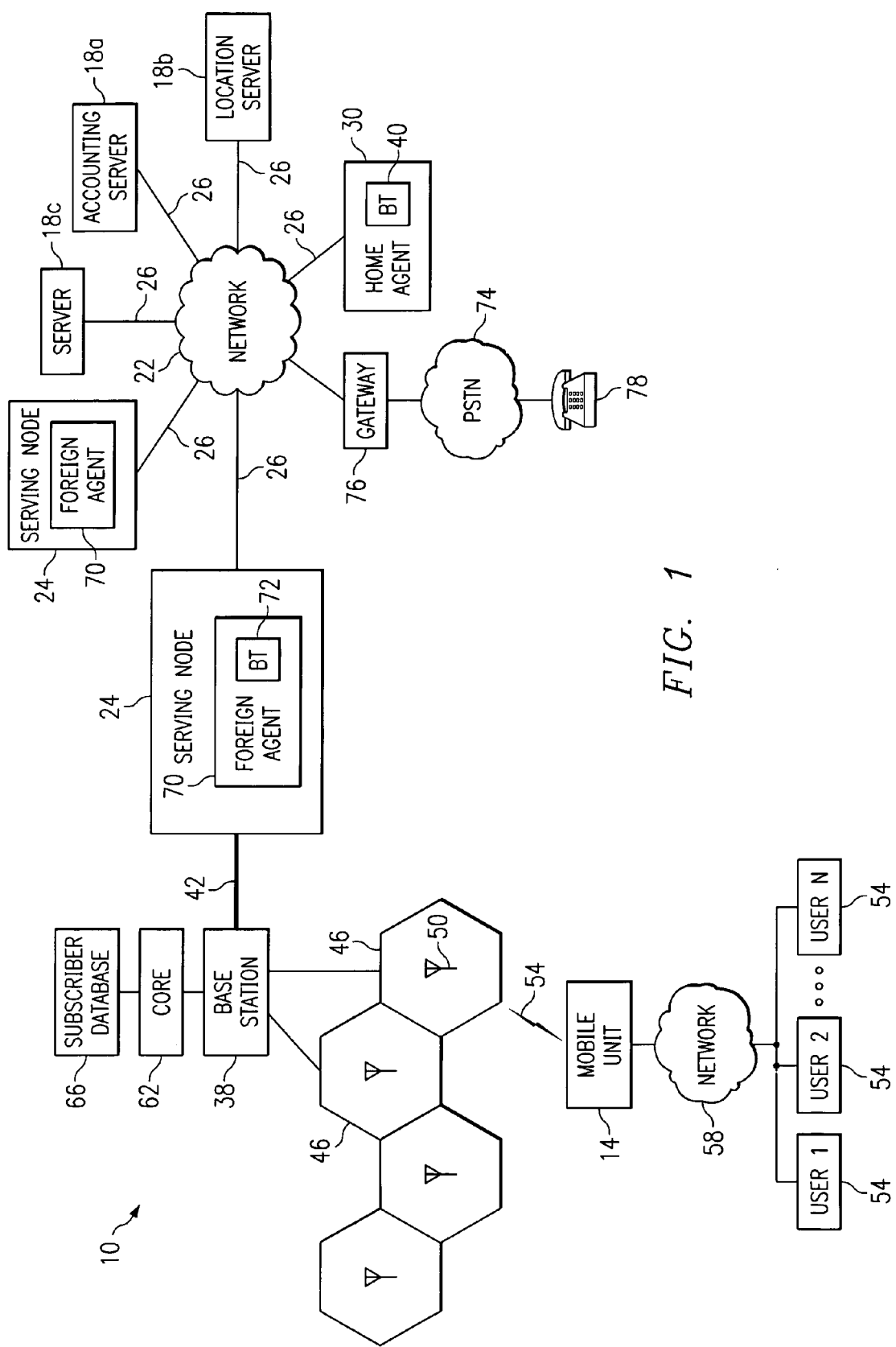
FIG. 1 is a block diagram illustrating a communications system in accordance with one embodiment of the present invention.

FIG. 1 is a block diagram illustrating a wireless communications system 10 in accordance with one embodiment of the present invention. The system 10 may transmit voice, audio, video and/or other types of data from one point to another. The system 10 comprises a plurality of mobile units 14 and a plurality of servers 18.

The mobile unit 14 may comprise a wireless telephone, a wireless interface terminal, or other suitable mobile device operable to provide wireless communication in the system 10. The servers 18 may comprise an accounting server 18a, a location server 18b, or any other suitable server 18c for providing services in the system 10.

The mobile units 14 and the servers 18 are coupled to one another and communicate through a network 22, in addition to a wireless infrastructure and serving nodes 24. The network 22 may provide this communication over a plurality of communication links 26. The network 22 may be any interconnection found on any computer network such as a wide area network, the Internet, or any other communications and data exchange systems created by connecting two or more computers.

The communication links 26 may be any type of communication link capable of supporting data transfer. In one embodiment, the communication links 26 may comprise, alone or in combination, Integrated Services Digital Network, Asymmetric Digital Subscriber Line, T1 or T3 communication lines, hard-wire lines, telephone lines or wireless communication. It will be understood that the communication links 26 may comprise other suitable types of data communication links. The communication links 26 may also connect to a plurality of intermediate servers between the network 22 and the mobile units 14 and the servers 18.

The system 10 also comprises at least one home agent 30 for each mobile unit 14, a plurality of packet data serving nodes 24, and a plurality of base stations 38. The home agent 30 comprises a binding table 40 that is operable to store data relating to the mobile unit 14, as described in more detail below. Each serving node 24 is coupled to a base station 38 through a plurality of radio packet (RP) data switch node links 42 or other suitable links. Each RP link 42 provides a logical path for a mobile unit packet session between the base station 38 and the serving node 24. Each base station 38 is operable to provide communication for mobile units 14 within any of a plurality of cells 46 for that base station 38. As used herein, "each" means every one of at least a subset of the identified items. The mobile unit 14 is operable to communicate with the base station 38 through a transceiver 50 in the cell 46 over a radio frequency (RF) link 54 or other suitable wireless link.

According to one embodiment, the link 54 is an RF link that may be based on established technologies or standards, such as IS-54 (TDMA), IS-95 (CDMA), GSM and AMPS, 802.11 based WLAN, or more recent technology, such as CDMA 2000 and W-CDMA or proprietary radio interfaces. In a particular embodiment, the link 54 comprises a code division multiple access (CDMA) link based on a CDMA standard and in which packets are segmented into frames for wireless transmission from the mobile unit 14 to the base station 38 where the frames are re-assembled to reconstitute the packets.

According to the embodiment illustrated in FIG. 1, the mobile unit 14 comprises a wireless interface terminal that is operable to host a plurality of users 54. The mobile unit 14 and the users 54 are coupled to one another and communicate through a network 58. The network 58 may be any interconnection found on any computer network such as a local area network, a wide area network, the Internet, or any other communications and data exchange systems created by connecting two or more computers.

The system 10 also comprises a core 62 that is coupled to the base station 38 and a subscriber database 66 that is coupled to the core 62. The core 62 is operable to perform authentication and to set up and disconnect calls for mobile units 14 in cells 46 for the corresponding base station 38. The core 62 is also operable to store service level agreements for each user 54 and to provide the agreements to the serving node 24 for service trigger management. The core 62 may comprise a mobile switching center that is operable to provide, in conjunction with the base station 38, switch and soft hand-off functionality for the system 10. In this way, voice, video, data and other information is routed to and from the mobile units 14 and connections are maintained with the mobile units 14 as they move throughout the system 10. The subscriber database 66 is operable to store information relating to mobile units 14 and/or users 54, such as name, address, account number, account type, and any other suitable information.

Each serving node 24 comprises a foreign agent 70 that is operable to provide communication between a mobile unit 14 and an endpoint through the network 22. The endpoint may comprise another mobile unit 14, a standard telephone, a server 18, or other suitable device. The foreign agent 70 provides functionality similar to the home agent 30 when the mobile unit 14 is out of range for communicating with the home agent 30. The foreign agent 70 comprises a binding table 72 that is operable to store data relating to the mobile unit 14.

According to one embodiment, for each mobile unit 14 corresponding to the home agent 30, the binding table 40 comprises a mobile unit identifier, a care of address (COA) for the current foreign agent 70, the internet protocol (IP) address or addresses assigned to the mobile unit 14, and any other suitable tunneling characteristics. Similarly, for each mobile unit 14 corresponding to the foreign agent 70, the binding table 72 comprises a mobile unit identifier, an address for the home agent 30, the IP address or addresses assigned to the mobile unit 14, and any other suitable tunneling characteristics.

The mobile unit 14 and the serving node 24 may communicate data and associated addressing information in-band and may also communicate with each other through out-of-band messaging. As used herein, "out-of-band" means communication of data that may be retrieved without inspecting the contents of the payload data of in-band messages. Thus, out-of-band communication provides a mechanism for communicating data in order to implement functions which may be undefined at the time the in-band messaging parameters are determined.

As described in more detail below in connection with FIGS. 2A–C, agent discovery messages, such as agent advertisement messages and agent solicitation messages, allow out-of-band communication that enables the mobile unit 14 to determine whether the mobile unit 14 is in communication with its home agent 30 or a foreign agent 70, to determine whether the mobile unit 14 has roamed from one foreign agent 70 to another foreign agent 70, to obtain a COA when in communication with a foreign agent 70, to assist the serving node 24 with service trigger management, or to obtain any other suitable information.

In addition to being operable to provide communication for mobile units 14 comprising the ability to communicate out-of-band messages, the serving node 24 is also operable to provide communication for standard mobile units that are incapable of communicating with out-of-band messages. Thus, for example, while establishing a connection for either a standard mobile unit or a mobile unit 14, the serving node 24 may identify the connection as out-of-band incapable or as out-of-band capable. In this way, the system 10 may support network communication for either type of mobile unit.

The network 22 connects a number of servers 18 to each other and to the serving node 24. The network 22 also connects the serving node 24, and thus the mobile unit 14, to the public switched telephone network (PSTN) 74 through a gateway 76. Accordingly, the mobile unit 14 may communicate through a serving node 24, the network 22 and the PSTN 74 with standard telephones, clients and computers using modems or digital subscriber line (DSL) connections or other telephony devices 78.

In operation, when a mobile unit 14 is outside the range of its home agent 30 such that communication with the network 22 is provided by a foreign agent 70, the serving node 24 recognizes that the mobile unit 14 is communicating with a transceiver 50 in a cell 46 for the base station 38 corresponding to the serving node 24. Based on this recognition, the foreign agent 70 for the serving node 24 transmits an agent advertisement message (AAM) on the RP link 42 for the mobile unit 14. In this way, only the mobile unit 14 associated with the RP link 42 receives the AAM. The AAM comprises a header, router advertisement information, a mobile advertisement extension and other extensions, as shown in FIG. 2B. The foreign agent 70 generates the AAM as a broadcast or multicast message, or other suitable type of message which may be processed by the mobile unit 14 before an IP address is assigned to the mobile unit 14, with a source address of the foreign agent 70. The foreign agent 70 provides the COA by setting the COA field in an agent advertisement extension of the AAM.

After receiving the AAM from the foreign agent 70, the mobile unit 14 transmits a registration request message (RReqM) to the foreign agent 70 as a home link directed broadcast message. The RReqM comprises a user identifier, a mobile identifier, a telephone number, or other suitable information from which a home agent 30 may identify the mobile unit 14.

The foreign agent 70 transmits the RReqM throughout the network 22 to identify home agents 30 for the mobile unit 14. Any home agent 30 in the home network for the mobile unit 14 that receives the RReqM from the foreign agent 70 may respond by transmitting a registration reply message (RRepM). The RRepM comprises a home agent address and a code field value indicating a rejection of the request. The foreign agent 70 receives an RRepM from each home agent 30, stores relevant information regarding the home agents 30 in the binding table 72, and transmits these messages to the mobile unit 14 over the RP link 42 for the mobile unit 14.

The mobile unit 14 selects one home agent 30 and transmits an RReqM to the foreign agent 70 that indicates which home agent 30 has been selected. The foreign agent 70 updates the binding table 72 and transmits the RReqM to the selected home agent 30 which assigns an IP address for the mobile unit 14. The foreign agent 70 also notifies the selected home agent 30 of the COA of the foreign agent 70 for forwarding packets to the mobile unit 14.

The selected home agent 30 transmits an RRepM comprising the IP address for the mobile unit 14 to the foreign agent 70. The foreign agent 70 transmits the RRepM to the mobile unit 14 over the RP link 42. The mobile unit 14 retrieves the IP address from the RRepM as its address for communication. At this point, the mobile unit 14 may send messages with the retrieved IP address as a source address and may process messages with the retrieved IP address as a destination address.

The selected home agent 30 notifies the network 22 with a broadcast message that any messages with the IP address of the mobile unit 14 as a destination address are to include a media access control (MAC) address for the home agent 30. The network routers update their routing tables to include the MAC address of the home agent 30 for the IP address of the mobile unit 14. Each message for the mobile unit 14 will then comprise the MAC address of the home agent 30 and the destination IP address of the mobile unit 14. The home agent 30 intercepts each packet destined for the mobile unit 14. Based on the COA of the foreign agent 70, the home agent 30 tunnels the intercepted packets to the foreign agent 70. The foreign agent 70 extracts the original packets and delivers them to the mobile unit 14.

If the mobile unit 14 moves to a cell 46 for a different base station 38 corresponding to a different serving node 24 and foreign agent 70, the home agent 30 updates the COA in the binding table 40 to correspond to the new foreign agent 70. In this way, messages for the mobile unit 14 will be tunneled to the appropriate foreign agent 70 which may then transmit the messages to the mobile unit 14. According to one embodiment, the mobile unit 14 sends an RReqM to the current foreign agent 70 which relays the message to the home agent 30. The home agent 30 updates entries in the binding table 40 with the new COA and sends an RRepM to the mobile unit 14 through the current foreign agent 70. The previous foreign agent 70 removes the information from the binding table 72 after the expiration of a timer.

FIG. 2A is a block diagram illustrating a message structure for an Agent Solicitation Message (ASM) 100 for providing out-of-band communication within the system 10 in accordance with one embodiment of the present invention. The ASM 100 comprises a header 104, a router solicitation field 108, and a vendor-specific extension 112. In accordance with one embodiment, the ASM 100 comprises an Internet Control Message Protocol (ICMP) router solicitation message with extensions. The ASM 100 is transmitted from a mobile unit 14 to a foreign agent 70 in order to set up sessions, to hand-off between serving nodes 24, to assist in service trigger management, or to perform any other suitable task. The vendor-specific extension 112 provides the out-of-band communication in that the foreign agent 70 receives and processes the information in the vendor-specific extension 112 without having to process payload data in in-band messages.

FIG. 2B is a block diagram illustrating a message structure for an Agent Advertisement Message (AAM) 120 for providing out-of-band communication within the system 10 in accordance with one embodiment of the present invention. The AAM 120 comprises a header 124, a router advertisement field 128, a mobile advertisement field 130, a prefix length extension 132, and a vendor-specific extension 134. In accordance with one embodiment, the AAM 120 comprises an ICMP router advertisement message with extensions. The AAM 120 is transmitted from the foreign agent 70 to the mobile unit 14 in order to set up sessions, to hand-off between serving nodes 24, to assist in service trigger management, or to perform any other suitable task. The vendor-specific extension 134 provides the out-of-band communication in that the mobile unit 14 receives and processes the information in the vendor-specific extension 134 without having to process payload data in in-band messages.

FIG. 2C is a block diagram illustrating a message structure for a vendor-specific extension 138 in accordance with one embodiment of the present invention. The vendor-specific extension 138 may comprise the vendor-specific extension 112 of the ASM 100 and/or the vendor-specific extension 134 of the AAM 120. The vendor-specific extension 138 comprises one or more data extensions 140.

Each data extension 140 comprises a data type 144 indicating what type of data is included in the data extension 140, a data length 148 indicating the length of the data included in the data extension 140, and a data field 152 that comprises the actual data for the data extension 140. The data type 144 may comprise "application identifier," "user data," or any other suitable data type known to both a service provider for the network 22 and the mobile vendors. The data length 148 may comprise the length of the data field 152 in bytes. The format and length of the data field 152 are determined by the data type 144 and data length 148. Data extensions 140 allow variable amounts of information to be included within each discovery message.

FIG. 3 is a block diagram illustrating a protocol stack 200 for communication over the wireless link 54 in accordance with one embodiment of the present invention. The protocol stack 200 is operable to authenticate mobile units 14 and establish radio frequency links to serving nodes 24. The protocol stack 200 comprises a physical layer 202, a MAC layer 204, a point-to-point protocol (PPP) layer 206, and an IP layer 208.

The protocol stack 200 also comprises a transport layer 210, an application layer 212, an access layer 214, and an ICMP layer 216. The transport layer 210 is operable to process in-band communications. The application layer 212 comprises one or more applications 222, each of which may be executed in the mobile unit 14 either alone or concurrently with other applications 222. The applications 222 may comprise telephony, video, voice, web browser, or any other suitable applications. The transport layer 210 comprises one or more protocols 220 for the applications 222. For example, the transport layer 210 may comprise a transmission control protocol 220a for packet data applications 222, a user datagram protocol 220b for mobile IP applications 222, or any other suitable protocol 220.

The access layer 214 comprises a service access manager 224 that is operable to manage out-of-band communication for a plurality of applications 222 in the mobile unit 14, and the ICMP layer 216 comprises an ICMP manager 228 that is operable to generate out-of-band messages for the mobile unit 14. The managers 224 and 228, as well as other components in the system 10, comprise logic encoded in media. The logic comprises functional instructions for carrying out program tasks. The media comprises computer disks or other computer-readable media, application-specific integrated circuits (ASICs), field-programmable gate arrays (FPGAs), digital signal processors (DSPs), other suitable specific or general purpose processors, transmission media or other suitable media in which logic may be encoded and utilized.

As described below in connection with FIG. 4, the access layer 214 also comprises a service access table 232 that is operable to store data for the service access manager 224 such as session allowability and additional information, and the ICMP layer 216 comprises a vendor-defined service type table 236 that is operable to store data for the ICMP manager 228 such as valid data types 144. The service access table 232 and the service type table 236 each comprise any suitable data store.

Because the mobile unit 14 may execute a plurality of applications 222 simultaneously, the vendor-specific extension 112 of the ASM 100 comprises a data extension 140 for an application identifier to identify the application 222 providing the data and a data extension 140 with the corresponding data from the application 222. In addition, the vendor-specific extension 134 of the AAM 120 comprises a data extension 140 for an application identifier to identify the application 222 to receive the data and a data extension 140 with the corresponding data for the application 222. The service access manager 224 is operable to resolve incoming and outgoing messages based on the application identifier for each application 222.

In operation, when an AAM 120 is received the ICMP manager 228 performs an initial parsing of the vendor-specific extension 134. The ICMP manager 228 compares the data type 144 with the service type table 236. If a match is found, the ICMP manager 228 provides the vendor-specific extension 134 to the service access manager 224. The service access manager 224 identifies the appropriate application 222 based on the application identifier in the vendor-specific extension 134 of the AAM 120 and provides the data to the identified application 222.

In addition, when an application 222 provides data for the foreign agent 70 to the service access manager 224, the service access manager 224 provides the data and the application identifier for the application 222 to the ICMP manager 228. The ICMP manager 228 then generates an ASM 100 including the application identifier and the data in the vendor-specific extension 112.

Figure 4:
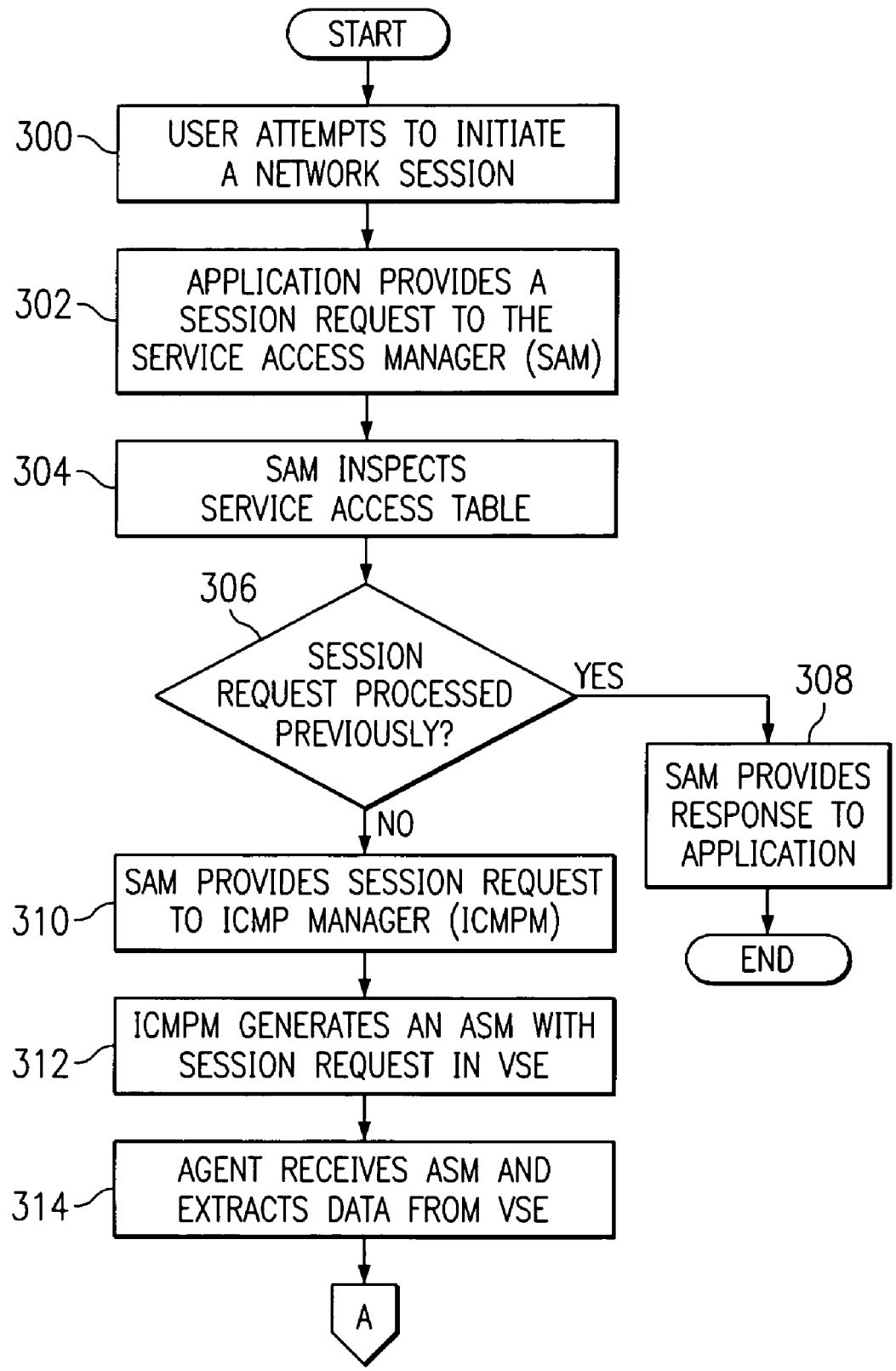
FIG. 4 is a flow diagram illustrating a method for providing mobile-assisted service trigger management in accordance with one embodiment of the present invention.
Figure 4:
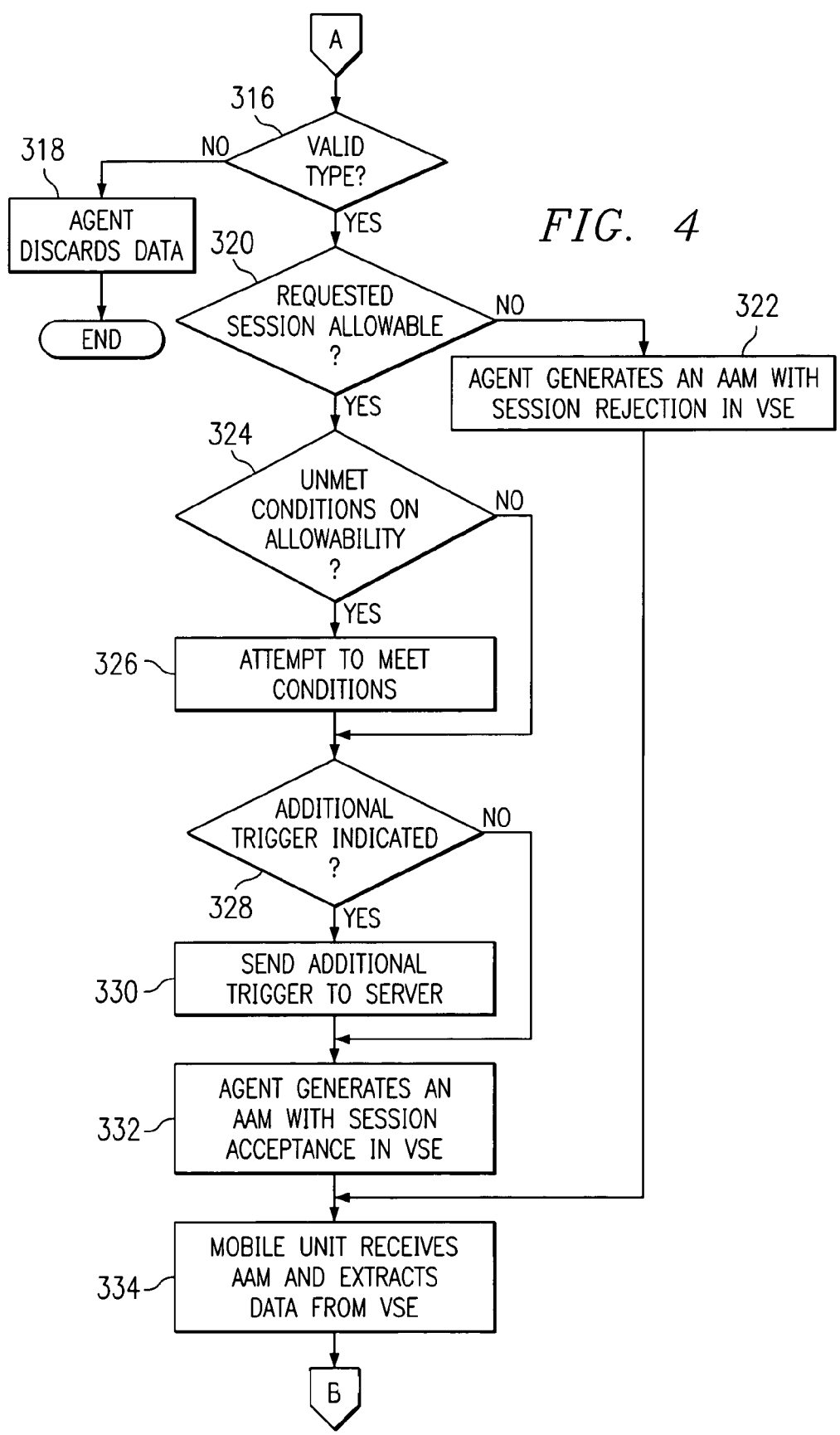
Figure 4:
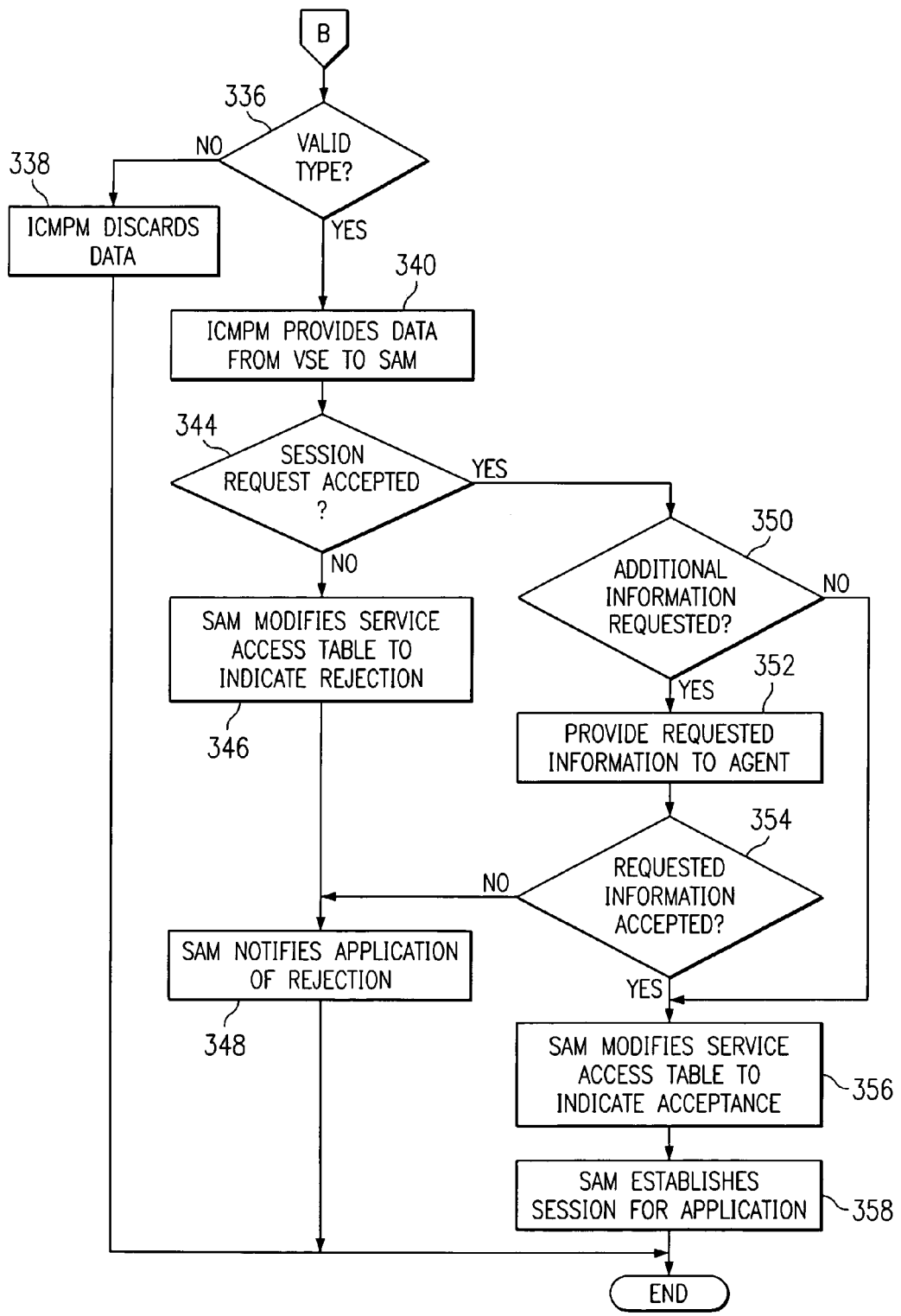

FIG. 4 is a flow diagram illustrating a method for providing mobile-assisted service trigger management in accordance with one embodiment of the present invention. The method begins at step 300 where a user 54 attempts to initiate a network session for an application 222 over an existing connection. At step 302, the application 222 provides a session request to the service access manager (SAM) 224. According to one embodiment, the session request comprises an application identifier for the application 222 and session data, such as a URL for a web-site which the user 54 is attempting to access.

At step 304, the SAM 224 inspects the service access table 232 which tracks previously accepted and rejected session initiation attempts for each application 222. At decisional step 306, the SAM 224 determines whether the session request was processed previously based on the data in the service access table 232. This determination may comprise, for example, matching a requested URL to a URL stored in the service access table 232 in association with the requesting application 222. If the session request was processed previously, the method follows the Yes branch from decisional step 306 to step 308.

At step 308, the SAM 224 provides the response as indicated in the service access table to the application 222. Thus, if the request was previously accepted by the serving node 24, the SAM 224 provides an "accepted" response to the application 222, while if the request was previously rejected by the serving node 24, the SAM 224 provides a "rejection" response to the application 222. At this point, the method comes to an end. Thus, using the service access table 232, the SAM 224 in the mobile unit 14 may handle previously processed session requests without utilizing communication resources or serving node resources and without accessing external resources. As used herein, therefore, without accessing external resources means without accessing external resources at the time the SAM 224 is processing the previously processed request, as opposed to at the time the SAM 224 initially processes a request and obtains the response for storage in the service access table 232.

Returning to decisional step 306, if the session request was not processed previously, the method follows the No branch from decisional step 306 to step 310. At step 310, the SAM 224 provides the session request to the ICMP manager (ICMPM) 228. At step 312, the ICMPM 228 generates an ASM 100 with the session request in the vendor-specific extension 112 and transmits the ASM 100 to the foreign agent 70.

At step 314, the foreign agent 70 receives the ASM 100 from the mobile unit 14 and extracts data from the vendor-specific extension 112. At decisional step 316, the foreign agent 70 determines whether the data types 144 for the data extensions 140 in the vendor-specific extension 112 are valid based on a comparison to data types 144 in the service type table 236. If the data types 144 are not valid, the method follows the No branch from decisional step 316 to step 318.

At step 318, the foreign agent 70 discards the data from the vendor-specific extension 112, and the method comes to an end. In this situation, the expiration of a timer at the mobile unit 14 may indicate to the mobile unit 14 that the foreign agent 70 has not responded in a timely manner. The mobile unit 14 may then attempt to re-send the ASM 100.

Returning to decisional step 316, if the data types 144 are valid, the method follows the Yes branch from decisional step 316 to decisional step 320. At decisional step 320, the foreign agent 70 determines whether the requested session is allowable based on the service level agreement for the user 54 provided to the serving node 24 by the core 62. If the requested session is not allowable, the method follows the No branch from decisional step 320 to step 322. At step 322, the foreign agent 70 generates an AAM 120 with a session rejection in the vendor-specific extension 134 and transmits the AAM 120 to the mobile unit 14. The method then continues to step 334.

Returning to decisional step 320, if the requested session is allowable, the method follows the Yes branch from decisional step 320 to decisional step 324. At decisional step 324, the foreign agent 70 determines whether any unmet conditions on the allowability of the session exist, such as user authentication, receipt of billing information, and the like. Accordingly, a session request may be allowed, rejected or conditionally allowed. If there are unmet conditions on the allowability of the session, the method follows the Yes branch from decisional step 324 to step 326. At step 326, the foreign agent 70 attempts to meet the conditions without user input, if possible. For example, if a user 54 may be authenticated based on data in the core 62 for that user 54, the foreign agent 70 may meet an authentication condition without user input. The method then continues to step 328.

Returning to decisional step 324, if there are no unmet conditions on the allowability of the session, the method follows the No branch from decisional step 324 to step 328. At step 328, the foreign agent determines whether any additional triggers are indicated by the session request. Additional triggers may comprise informing a server 18 of the session request or other suitable triggers. If an additional trigger is indicated, the method follows the Yes branch from decisional step 328 to step 330. At step 330, the foreign agent 70 sends an additional trigger to one or more servers 18 through the network 22 in accordance with the indicated additional triggers. The method then continues to step 332.

Returning to decisional step 328, if an additional trigger is not indicated, the method follows the No branch from decisional step 328 to step 332. At step 332, the foreign agent 70 generates an AAM 120 with a session acceptance in the vendor-specific extension 134 and transmits the AAM 120 to the mobile unit 14. At step 334, the mobile unit 14 receives the AAM 120 generated in either step 322 or step 332 and extracts the data from the vendor-specific extension 134.

At decisional step 336, the ICMPM 228 determines whether the data types 144 for the data extensions 140 in the vendor-specific extension 134 are valid based on a comparison to data types 144 in the service type table 236. If the data types 144 are not valid, the method follows the No branch from decisional step 336 to step 338. At step 338, the ICMPM 228 discards the data from the vendor-specific extension 134, and the method comes to an end. In this situation, the expiration of a timer at the foreign agent 70 may indicate to the foreign agent 70 that the mobile unit 14 has not responded in a timely manner. The foreign agent 70 may then attempt to re-send the AAM 120.

Returning to decisional step 336, if the data types 144 are valid, the method follows the Yes branch from decisional step 336 to step 340. At step 340, the ICMPM 228 provides the data from the vendor-specific extension 134 to the SAM 224. At decisional step 344, the SAM 224 determines whether the session request was accepted by the foreign agent 70. If the session request was not accepted, the method follows the No branch from decisional step 344 to step 346. At step 346, the SAM 224 modifies the service access table 232 to indicate that the session request was rejected. At step 348, the SAM 224 notifies the application 222 that the session request was rejected, at which point the method comes to an end.

Returning to decisional step 344, if the session request was accepted, the method follows the Yes branch from decisional step 344 to decisional step 350. At decisional step 350, the SAM 224 determines whether additional information was requested by the foreign agent 70. For example, if an unmet condition on allowability was found to exist in step 324 that could not be met without user input in step 326, additional information may be requested through the vendor-specific extension 134 of the AAM 120. If additional information was requested, the method follows the Yes branch from decisional step 350 to step 352.

At step 352, the additional information received from the user 54 is provided to the foreign agent 70. At decisional step 354, the foreign agent 70 determines whether the additional information is acceptable. If the additional information is unacceptable, the method follows the No branch from decisional step 354 and returns to step 348 where the SAM 224 notifies the application 222 that the session request was rejected.

Returning to decisional step 354, if the additional information is acceptable, the method follows the Yes branch from decisional step 354 to step 356. Also, returning to decisional step 350, if additional information was not requested, the method follows the No branch from decisional step 350 to step 356. At step 356, the SAM 224 modifies the service access table 232 to indicate that the session request was accepted. At step 358, the SAM 224 establishes the requested session for the application 222, at which point the method comes to an end.

In this way, out-of-band communication is provided between the mobile unit 14 and the foreign agent 70 of the serving node 24. In addition, previously accepted or rejected session requests are tracked in the mobile unit 14 through the service access table 232 such that the serving node 24 is not required to re-verify a session request that has been processed previously. Thus, the foreign agent 70 may accept or reject session requests without checking the contents of the payload data for each message sent from the mobile unit 14. Accordingly, the burden on the resources of the serving node 24 is greatly reduced, freeing those resources to accomplish other tasks.

Although the present invention has been described with several embodiments, various changes and modifications may be suggested to one skilled in the art. It is intended that the present invention encompasses such changes and modifications as fall within the scope of the appended claims.

What is claimed is:

1. A method for providing service trigger management in a wireless network, comprising:
    generating an application request for access to a network resource from a mobile unit; and
    determining allowability of the application request without accessing external resources, based on session allowability data stored in the mobile unit indicating allowability of a previous request;
    wherein allowability of the previous request is determined through an out-of-band communication carried in a vendor-specific extension of a discovery message.

2. The method of claim 1, wherein determining allowability of the application request further comprises determining whether the previous request was allowed or rejected based on the stored session allowability data when a determination is made that session allowability data has been stored.

3. The method of claim 1, further comprising determining allowability of the application request based on a service agreement by accessing external resources when a determination is made that session allowability data has not been stored.

4. The method of claim 1, the discovery messages comprising an agent solicitation messages, the vendor-specific extension comprising the application request.

5. The method of claim 4, the discovery messages further comprising an agent advertisement message, the vendor-specific extension comprising an acceptance or a rejection of the application request.

6. The method of claim 1, wherein the network resource is a specified web-site.

7. A system for providing service trigger management in a wireless network, comprising:
    means for generating an application request for access to a network resource from a mobile unit; and
    means for determining allowability of the application request without accessing external resources, based on session allowability data stored in the mobile unit indicating allowability of a previous request;
    wherein allowability of the previous request is determined through an out-of-band communication carried in a vendor-specific extension of a discovery message.

8. The system of claim 7, wherein means for determining allowability of the application request further comprises means for determining whether the previous request was allowed or rejected based on the stored session allowability data when a determination is made that session allowability data has been stored.

9. The system of claim 7, further comprising means for determining allowability of the application request based on a service agreement by accessing external resources when a determination is made that session allowability data has not been stored.

10. The system of claim 7, the discovery messages comprising an agent solicitation message, the vendor-specific extension comprising the application request.

11. The system of claim 10, the discovery messages further comprising an agent advertisement message, the vendor-specific extension comprising an acceptance or a rejection of the application request.

12. The system of claim 7, wherein the network resource is a specified web-site.

13. A system for providing service trigger management in a wireless network, comprising:
    a computer-processable medium; and
    logic stored on the computer-processable medium, the logic operable to:
        generate an application request for access to a network resource from a mobile unit; and
        determine allowability of the application request without accessing external resources, based on session allowability data stored in the mobile unit indicating allowability of a previous request;
        wherein allowability of the previous request is determined through an out-of-band communication carried in a vendor-specific extension of a discovery message.

14. The system of claim 13, the logic further operable to determine allowability of the application request by determining whether the previous request was allowed or rejected based on the stored session allowability data when a determination is made that session allowability data has been stored.

15. The system of claim 13, the logic further operable to determine allowability of the application request based on a service agreement by accessing external resources when a determination is made that session allowability data has not been stored.

16. The system of claim 13, the discovery messages comprising an agent solicitation message, the vendor-specific extension comprising the application request.

17. The system of claim 16, the discovery message further comprising an agent advertisement message, the vendor-specific extension comprising an acceptance or a rejection of the application request.

18. The system of claim 13, wherein the network resource is a specified web-site.

19. A mobile unit operable to provide service trigger management in a wireless network, comprising:
    an application operable to generate an application level signaling message associated with a network session, wherein the message is communicated to a serving node such that the serving node is made aware of session activity of the mobile unit; and a service access manager operable to determine allowability of the session without accessing external resources, based on session allowability data stored in the mobile unit indicating allowability of a previous request;

wherein allowability of the previous request is determined through an out-of-bound communication carried in a vendor-specific extension of a discovery message.

20. The mobile unit of claim 19, further comprising a service access table operable to store the session allowability data.

21. The mobile unit of claim 20, the service access manager further operable to determine allowability of the session by determining whether the previous request was allowed or rejected based on the stored session allowability data when a determination is made that session allowability data has been stored in the service access table.

22. The mobile unit of claim 20, the service access manager further operable to determine allowability of the session based on a service agreement by accessing external resources when a determination is made that session allowability data has not been stored in the service access table.

23. The mobile unit of claim 19, the discovery message comprising an agent solicitation message, the vendor-specific extension comprising the signaling message.

24. The mobile unit of claim 23, the discovery message further comprising an agent advertisement message, the vendor-specific extension comprising an acceptance or a rejection of the signaling message.

25. The mobile unit of claim 24, the service access table further operable to store session allowability data for the signaling message, the session allowability data comprising the acceptance or the rejection of the signaling message.

26. The mobile unit of claim 19, the network session comprising access to a specified web-site.

27. A method for providing service trigger management in a wireless network, comprising:

receiving a first out-of-band communication from a mobile unit at a foreign agent of a serving node, the first out-of-band communication comprising a vendor-specific extension carrying a request for a network session;

determining whether the request is allowable; and sending a second out-of-band communication from the foreign agent to the mobile unit, the second out-of-band communication comprising a vendor-specific extension carrying an acceptance or a rejection of the request based on the determination of whether the request is allowable.

28. The method of claim 27, determining whether the request is allowable comprising comparing the request to a service agreement for the mobile unit.

29. The method of claim 27, the first out-of-bound communication comprising agent solicitation messages and the second out-of-bound communication comprising agent advertisement messages.

30. The method of claim 29, further comprising generating an agent advertisement message wherein the vendor-specific extension comprises a rejection of the request when the request is determined to be unallowable.

31. The method of claim 29, further comprising generating an agent advertisement message wherein the vendor-specific extension comprises an acceptance of the request when the request is determined to be allowable.

32. A method for providing service trigger management in a wireless network, comprising:

receiving out-of-band communication from a mobile unit at a foreign agent of a serving node, the received out-of-band communication comprising a request for a network session;

determining whether the request is allowable;

sending out-of-band communication from the foreign agent to the mobile unit, the sent out-of-band communication comprising an acceptance or a rejection of the request based on the determination of whether the request is allowable, wherein the received and sent out-of-band communication comprises discovery messages, and wherein the discovery messages comprises agent solicitation messages and agent advertisement messages, the agent solicitation messages comprising a vendor-specific extension, the vendor-specific extension comprising the request;

when the request is determined to be allowable, determining whether the request is conditionally allowable such that the request is allowable after specified unmet conditions have been met;

generating an agent advertisement message comprising a vendor-specific extension, the vendor specific extension comprising an acceptance of the request when the request is determined to be allowable and when the request is not determined to be conditionally allowable;

attempting to meet the specified unmet conditions when the request is determined to be conditionally allowable;

generating an agent advertisement message comprising a vendor-specific extension, the vendor specific extension comprising an acceptance of the request when the request is determined to be conditionally allowable and when the specified unmet conditions have been met; and generating an agent advertisement message comprising a vendor-specific extension, the vendor specific extension comprising an acceptance of the request and comprising the specified unmet conditions when the request is determined to be conditionally allowable and when the specified unmet conditions have not been met.

33. The method of claim 27, further comprising:

determining whether a trigger is indicated for a specified server when the request is determined to be allowable; and sending the trigger to the specified server when the trigger is determined to be indicated.

34. A system for providing service trigger management in a wireless network, comprising:

means for receiving a first out-of-band communication from a mobile unit at a foreign agent of a serving node, the first out-of-band communication comprising a vendor-specific extension carrying a request for a network session;

means for determining whether the request is allowable; and means for sending a second out-of-band communication from the foreign agent to the mobile unit, the second out-of-band communication comprising a vendor-specific extension carrying an acceptance or a rejection of the request based on the determination of whether the request is allowable.

35. The system of claim 34, the means for determining whether the request is allowable comprising means for comparing the request to a service agreement for the mobile unit.

36. The system of claim 34, the first out-of-bound communication comprising agent solicitation messages and the second out-of-bound communication comprising agent advertisement messages.

37. The system of claim 36, further comprising means for generating an agent advertisement message wherein the vendor-specific extension comprises a rejection of the request when the request is determined to be unallowable.

38. The system of claim 36, further comprising means for generating an agent advertisement message wherein the vendor-specific extension comprises an acceptance of the request when the request is determined to be allowable.

39. A system for providing service trigger management in a wireless network, comprising:
  means for receiving out-of-band communication from a mobile unit at a foreign agent of a serving node, the received out-of-band communication comprising a request for a network session;
  means for determining whether the request is allowable;
  means for sending out-of-band communication from the foreign agent to the mobile unit, the sent out-of-band communication comprising an acceptance or a rejection of the request based on the determination of whether the request is allowable, wherein the received and sent out-of-band communication comprises discovery messages, and wherein the discovery messages comprises agent solicitation messages and agent advertisement messages, the agent solicitation messages comprising a vendor-specific extension, the vendor-specific extension comprising the request;
  when the request is determined to be allowable, means for determining whether the request is conditionally allowable such that the request is allowable after specified unmet conditions have been met;
  means for generating an agent advertisement message comprising a vendor-specific extension, the vendor specific extension comprising an acceptance of the request when the request is determined to be allowable and when the request is not determined to be conditionally allowable;
  means for attempting to meet the specified unmet conditions when the request is determined to be conditionally allowable;
  means for generating an agent advertisement message comprising a vendor-specific extension, the vendor specific extension comprising an acceptance of the request when the request is determined to be conditionally allowable and when the specified unmet conditions have been met; and
  means for generating an agent advertisement message comprising a vendor-specific extension, the vendor specific extension comprising an acceptance of the request and comprising the specified unmet conditions when the request is determined to be conditionally allowable and when the specified unmet conditions have not been met.

40. The system of claim 34, further comprising:
  means for determining whether a trigger is indicated for a specified server when the request is determined to be allowable; and
  means for sending the trigger to the specified server when the trigger is determined to be indicated.

41. A system for providing service trigger management in a wireless network, comprising:
  a computer-processable medium; and
  logic stored on the computer-processable medium, the logic operable to receive a first out-of-band communication from a mobile unit, the first out-of-band communication comprising a vendor-specific extension carrying a request for a network session, to determine whether the request is allowable, and to send a second out-of-band communication to the mobile unit, the second out-of-band communication comprising a vendor-specific extension carrying an acceptance or a rejection of the request based on the determination of whether the request is allowable.

42. The system of claim 41, the logic further operable to determine whether the request is allowable by comparing the request to a service agreement for the mobile unit.

43. The system of claim 41, the first out-of-bound communication comprising agent solicitation messages and the second out-of-bound communication comprising agent advertisement messages.

44. The system of claim 43, the logic further operable to generate an agent advertisement message wherein the vendor-specific extension comprises a rejection of the request when the request is determined to be unallowable.

45. The system of claim 43, the logic further operable to generate an agent advertisement message wherein the vendor-specific extension comprises an acceptance of the request when the request is determined to be allowable.

46. A system for providing service trigger management in a wireless network, comprising:
  a computer-processable medium;
  logic stored on the computer-processable medium, the logic operable to receive out-of-band communication, the received out-of-band communication comprising a request for a network session, to determine whether the request is allowable, and to send out-of-band communication from the foreign agent to the mobile unit, the sent out-of-band communication comprising an acceptance or a rejection of the request based on the determination of whether the request is allowable, wherein the received and sent out-of-band communication comprises discovery messages, and wherein the discovery messages comprises agent solicitation messages and agent advertisement messages, the agent solicitation messages comprising a vendor-specific extension, the vendor-specific extension comprising the request;
  when the request is determined to be allowable, to determine whether the request is conditionally allowable such that the request is allowable after specified unmet conditions have been met;
  to generate an agent advertisement message comprising a vendor-specific extension, the vendor specific extension comprising an acceptance of the request when the request is determined to be allowable and when the request is not determined to be conditionally allowable;
  to attempt to meet the specified unmet conditions when the request is determined to be conditionally allowable;
  to generate an agent advertisement message comprising a vendor-specific extension, the vendor specific extension comprising an acceptance of the request when the request is determined to be conditionally allowable and when the specified unmet conditions have been met; and
  to generate an agent advertisement message comprising a vendor-specific extension, the vendor specific extension comprising an acceptance of the request and comprising the specified unmet conditions when the request is determined to be conditionally allowable and when the specified unmet conditions have not been met.

47. The system of claim 41, the logic further operable to determine whether a trigger is indicated for a specified server when the request is determined to be allowable and to send the trigger to the specified server when the trigger is determined to be indicated.

\* \* \* \* \*